United States Patent
Parikh

(10) Patent No.: US 9,590,741 B2
(45) Date of Patent: Mar. 7, 2017

(54) CURRENT-MODE DRIVER

(71) Applicant: Fujitsu Limited, Kawasaki-shi (JP)

(72) Inventor: Samir Parikh, San Jose, CA (US)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 14/631,198

(22) Filed: Feb. 25, 2015

(65) Prior Publication Data

US 2016/0248517 A1 Aug. 25, 2016

(51) Int. Cl.
*H04B 10/58* (2013.01)
*H04B 10/50* (2013.01)
*H04L 25/03* (2006.01)

(52) U.S. Cl.
CPC ....... *H04B 10/58* (2013.01); *H04L 25/03885* (2013.01); *H04B 10/504* (2013.01)

(58) Field of Classification Search
CPC ...... H04B 10/50–10/504; H04B 10/58–10/588
See application file for complete search history.

(56) References Cited

U.S. PATENT DOCUMENTS

| | | | |
|---|---|---|---|
| 9,231,704 B1* | 1/2016 | Zhou | H04B 10/504 |
| 2001/0048541 A1* | 12/2001 | Ishii | H04B 10/2507 398/201 |
| 2011/0210777 A1* | 9/2011 | Huang | H04B 10/25137 327/231 |
| 2011/0268454 A1* | 11/2011 | Fujita | H01S 5/0428 398/135 |

OTHER PUBLICATIONS

John F. Bulzacchelli, "A 10-Gb/s 5-Tap DFE/4-Tap FFE Transceiver in 90-nm CMOS Technology," IEEE Journal of Solid-State Circuits, vol. 41, No. 12, Dec. 2006 (16 pages).

* cited by examiner

*Primary Examiner* — David Payne
*Assistant Examiner* — Casey Kretzer
(74) *Attorney, Agent, or Firm* — Baker Botts L.L.P.

(57) ABSTRACT

According to one embodiment, a current-mode driver provides pre-emphasis for a transmitter. The current-mode driver includes a filtering circuit comprising a resistor, an inductor, and a capacitor. The filtering circuit is operable to receive a data signal and produce a filtered data signal. The filtering circuit may be tuned to produce a ringing frequency with an underdamped transient decay in the filtered data signal that compensates for signal degradation caused by the optical transmitter. The current-mode driver may also include a current source coupled to the filtering circuit. The current source may be operable to generate a compensation signal based on the filtered data signal that is capable of driving the transmitter.

20 Claims, 3 Drawing Sheets

CURRENT-MODE DRIVER

TECHNICAL FIELD

This disclosure relates generally to electronic communications and, more particularly, to an improved current-mode driver.

BACKGROUND

In electronic circuits, a current-mode driver may communicate electronic data signals at high transmission rates. Current-mode drivers are used in a variety of applications such as fiber optics, telecommunications, and other high-speed integrated systems. In general, a current-mode driver is used to transmit data ranging from a few hundred Mbps to tens of Gbps across a printed circuit board and/or optical fibers. As communication devices become faster and the demand for communication bandwidth increases, there is a corresponding desire to increase the speed and quality of connections between the components used in such devices. Optical transmitters such as vertical-cavity surface-emitting lasers (VCSELs) are typical light sources in high-speed optical links. A VCSEL-based optical communication link requires a VCSEL driver to modulate the drive signal of a VCSEL during the communication of signals.

SUMMARY

According to one embodiment, a current-mode driver provides signal correction for a transmitter. The current-mode driver includes filtering circuit comprising a resistor, an inductor, and a capacitor. The filtering circuit is operable to receive a data signal and produce a filtered data signal. The filtering circuit may be tuned to produce a ringing frequency with an underdamped transient decay in the filtered data signal that compensates for signal degradation caused by the transmitter. The current-mode driver may also include a current source coupled in series to the filtering circuit. The current source may be operable to generate a compensation signal proportional the filtered data signal that is capable of driving the transmitter.

In another embodiment, an apparatus includes a filtering circuit including resistor, an inductor, and a capacitor in series. The filtering circuit may receive a data signal and generate a filtered data signal according to characteristics of the resistor, inductor, and capacitor. The apparatus may also include an analog current source coupled in series to the filtering circuit. The analog current source may generate a compensation signal proportional to the filtered data signal and operable to drive a transmitter.

Certain embodiments of the present disclosure may provide one or more technical advantages. A technical advantage of one embodiment is reduced power consumption of the current-mode driver. Typical circuits providing pre-emphasis or equalization such as feed-forward equalization circuits often rely on multiple current sources, which require more power to operate. By implementing pre-emphasis (transmission equalization) using a current-mode driver with a built-in RLC filter, it is possible to reduce the amount of current sources required to increase signal quality in the high-speed data transmission system. By reducing the number of components required for signal correction, the current-mode driver becomes less expensive to manufacture. One or more other technical advantages may be readily apparent to one skilled in the art from the figures, descriptions, and claims included herein.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Embodiments of the present disclosure and its advantages are best understood by referring to FIGS. 1-4, like numerals being used for like and corresponding parts of the various drawings.

Figure 1:
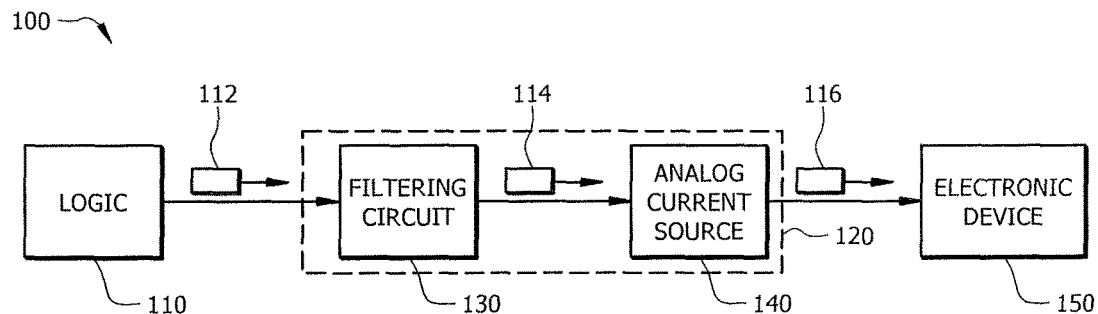
FIG. 1 is block diagram showing an example embodiment of a data transmission system implementing a current-mode driver.

FIG. 1 is block diagram showing an example embodiment of a data transmission system 100 implementing a current-mode driver 120. Data transmission system 100 includes a logic 110 coupled to current-mode driver 120 and an electronic device 150. Current-mode driver 120 comprises a filtering circuit 130 and an analog current source 140. In the illustrated embodiment, the output of current-mode driver 120 is coupled to electronic device 150.

In certain embodiments, data transmission system 100 is configured to process high-speed data streams (i.e., data bit rates greater than 1 Gbps). For example, current-mode driver 120 may receive a data signal 112 having a data rate of 25 Gbps from logic 110. Filtering circuit 130 may then filter data signal 112, producing a filtered data signal 114. Filtered data signal 114 may be used by analog current source 140 to produce a compensation signal 116. Compensation signal 116 may then drive electronic device 150. For example, electronic device 150 may be an optical transmitter modulated by compensation signal 116. Accordingly, current-mode driver 120 may provide transmit equalization to data signal 112 so that compensation signal 116 may overcome signal degradation and attenuation caused by data transmission system 100.

Logic 110 represents any device capable of producing data signal 112 for use by electronic device 150. In certain embodiments, logic 110 may be encoded in one or more non-transitory, tangible media, such as a computer readable medium, and may perform operations when executed by a computer. In certain embodiments, logic 110 may be implemented as a processor or a microcontroller.

Data signal 112 may be sinusoidal, square, triangular, or any other appropriate voltage or current signal. The frequency of data signal 112 may be application dependent and vary based on electronic device 150. For example, if electronic device 150 is an optical transmitter, logic 110 may produce data signal 112 for transmission at high frequencies (e.g. 1-50 Gbps). As described in greater detail below, data signal 112 may be a series of square-wave-type pulses with vertical rising and falling edges and a flat frequency response.

In certain embodiments, data transmission system 100 is implemented on a printed circuit board (PCB). The PCB may be single sided, double sided, or multi-layer. In some embodiments, the PCB is a standard FR-4 PCB. Traces of conductive material disposed on the PCB may couple the components of data transmission system 100. For example, traces may couple logic 110 to filtering circuit 120, analog current source 140, and electronic device 150. PCB traces may be made of fine lines of metal or other conductive material. As an example, the conductive material of the PCB traces may be copper or copper-based and have a width of approximately 100 µm or less. As another example, the conductive material of the traces may be silver or silver-based and have a width of approximately 100 µm or less. Although this disclosure describes particular traces made of particular materials with particular widths, this disclosure contemplates any suitable tracks made of any suitable materials with any suitable widths.

Communication channels such as PCB traces, via, connectors, backplanes and fiber optics may produce signal degradation and attenuation in data signal 112. At high frequencies, the length and width of the PCB traces may introduce capacitive and resistive effects on data signal 112. Electronic device 150 may also introduce bandwidth limitations (e.g., parasitic capacitances) that affect the transmission of data signal 112. These effects may lead to changes in the rise time and amplitude of data signal 112 resulting in inter-symbol interference (ISI). ISI may cause bits in data signal 112 to stretch or become distorted. These distortions may cause data signal 112 to have pulses with sloped leading and trailing edges and unsmooth tops causing interfere with the transmission of the following data bits. These distortions may cause operational defects in electronic device 150. For example, electronic device 150 may be an optical transmitter such as vertical-cavity surface-emitting laser (VCSEL). The ISI created in data signal 112 may cause the VCSEL to transmit erroneously or not at all. To improve the performance of electronic device 150, current-mode driver 120 may perform pre-emphasis on data signal 112. Pre-emphasis, also called transmit equalization, refers to the process of reversing or preempting the distortion incurred by a signal transmitted through a communication channel.

To overcome the ISI created by the PCB and electronic device 150, current-mode driver 120 may be designed to compensate for the future degradation of data signal 112. Current-mode driver 120 comprises filtering circuit 130 and analog current source 140. Current-mode driver 120 receives data signal 112 from logic 110 and filters it using filtering circuit 130 to produce filtered data signal 114. During the filtering process, filtering circuit 130 may alter data signal 112 to compensate for future signal attenuation and degradation. Filtered data signal 114 may then be used by analog current source 140 to produce compensation signal 116. Compensation signal 116 may drive electronic device 150.

Electronic device 150 may be any suitable device capable of using compensation signal 122. In certain embodiments, electronic device 150 is an optical transmitter capable of being used in fiber optic communications, bar code readers, laser pointers, optical device reading and writing (CD/DVD/Blu-ray), laser printing, directional lighting, and scanning. For example, the optical transmitter may be a VCSEL, laser diode, or an edge-emitting laser. In embodiments where electronic device 150 is a VCSEL, electronic device 150 may be used to optically transmit data signal 112 produced by logic 110. In some embodiments, a VCSEL may reside in a transmitter and may be biased and modulated by compensation signal 116. In this manner, a VCSEL may transmit data signal 112 from logic 110 across an optical medium such as a fiber optic cable. In other embodiments, electronic device 150 may be a non-optical device such as a USB cable or a FPGA driven by current-mode driver 120.

Figure 2:
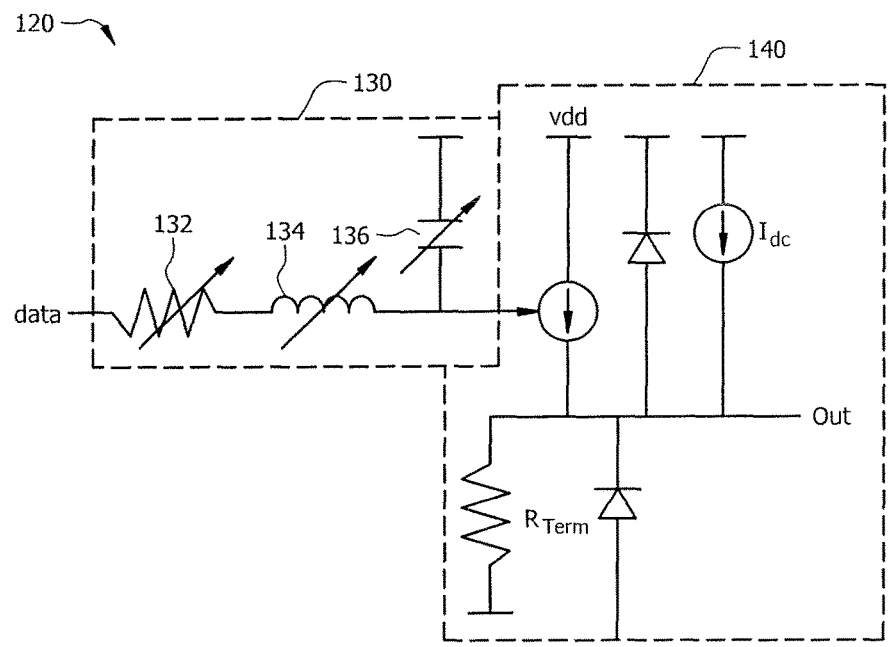
FIG. 2 is a circuit diagram illustrating an example embodiment of a current-mode driver.
Figure 3A:
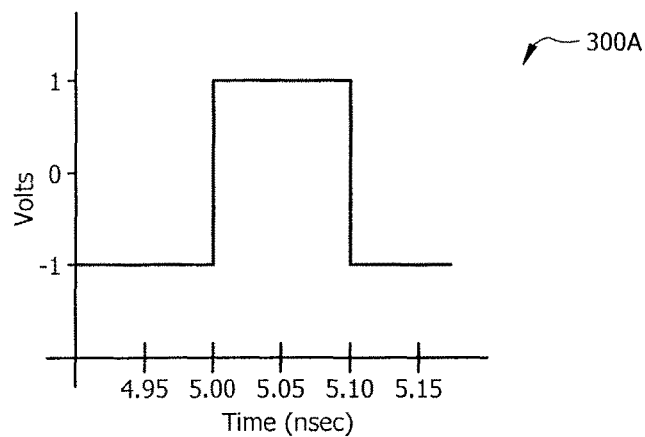
FIGS. 3A-D are example waveforms showing the effects a current-mode driver has on a data signal.
Figure 3B:
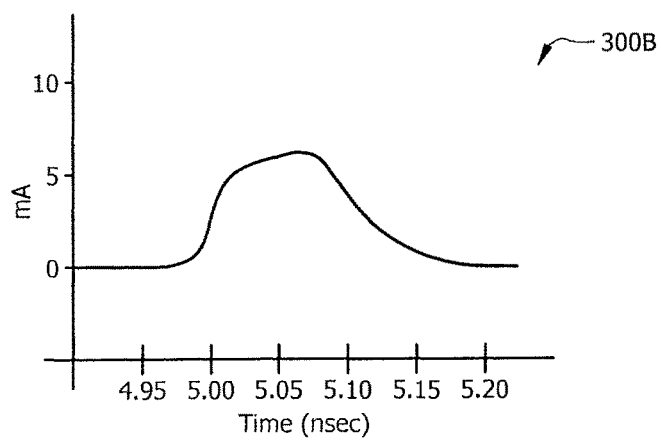
Figure 3C:
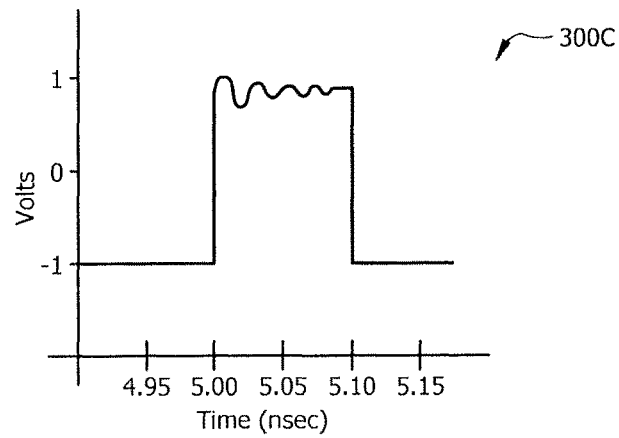
Figure 3D:
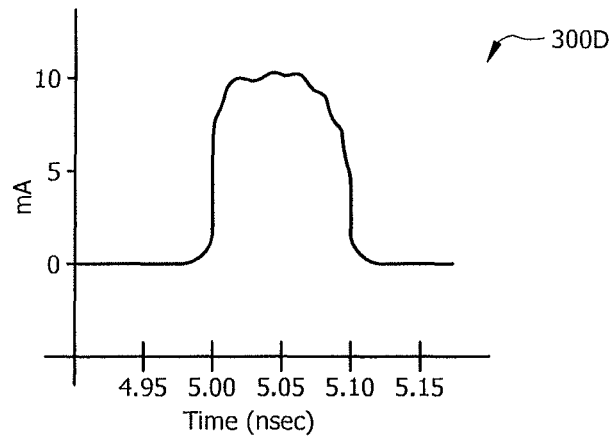

FIG. 2 is a circuit diagram illustrating an example embodiment of a current-mode driver 120. Current-mode driver 120 includes filtering circuit 130 and analog current source 140. Filtering circuit 130 comprises resistor 132, inductor 134, and capacitor 136. In the illustrated embodiment, filtering circuit 130 is a series RLC filter. In certain embodiments, current-mode driver 120 includes a DC current source, $I_{DC}$, a termination resistor, $R_{Term}$, and one or more electrostatic discharge components (e.g., reverse biased diodes).

Filtering circuit 130 creates ringing in data signal 112. The frequency of the ringing is determined by the equation: $1/\sqrt{(LC)}$, where L is the value of inductor 134 in henries and C is the value of capacitor 136 in farads. Filtering circuit 130 may produce an underdamped, transient decay in the ringing according to the equation: $R/(2L)$, where R is the value of the resistor in ohms and L is the value of the inductor in henries. For example, the LC components of filtering circuit 130 may be designed to produce ringing that is four times the frequency of data signal 112. If data signal 112 has a frequency of 10 Gbps, then the inductor and capacitor may be sized to produce ringing with a frequency 40 Gbps. The RL components may be designed to produce a transient decay in the ringing that settles before the end of the bit period. Depending on the frequency of data signal 112, electronic device 150, and conditions of data transmission system 100, filtering circuit 130 may be tuned to provide a different ringing frequency or transient decay.

In certain embodiments, the values of the RLC components are determined based on the impulse response of data transmission system 100. The impulse response may be affected by bandwidth limitations caused by electronic device 150 and signal degradation caused by the PCB traces and backplane. By properly tuning the RLC components, filtering circuit 130 may produce filtered data signal 114 comprising a ringing frequency with an underdamped, transient decay that compensates for the bandwidth limitations found in PCB traces and electronic device 150. Thus, filtering circuit 130 may introduce the inverse of the impulse response created by the PCB and electronic device 150.

Filtering circuit 130 may comprise a variable resistor, a variable capacitor, and a variable inductor. For example, resistor 132 in filtering circuit 130 may be a digital potentiometer that can change resistance based on a digital signal input. Similarly, capacitor 136 in filtering circuit 130 may be an electronically variable capacitor or a digitally tuned capacitor. In certain embodiments, inductor 134 may be a variable inductor where the inductance is varied using MOSFET switches and inventors. By including an adjustable resistor, capacitor, and inductor filtering circuit 130 may adjust the ringing frequency and transient decay created by the RLC components allowing for more accurate pre-emphasis of data signal 112. Resistor 132 and capacitor 134 may be adjusted based on changes to the circuit such as temperature fluctuations or changes in the frequency of data signal 112.

Analog current source 140 may include any suitable mechanism for producing a current that follows filtered data signal 114. In certain embodiments, analog current source 140 may be a transconductance amplifier, wherein the output current is proportional to the input voltage. In some embodiments, analog current source 140 may be a cascode amplifier. Analog current source 140 may comprise one or more BJTs, FETs, MOSFETs, or operational amplifiers that use supply voltage $V_{dd}$. In the illustrated embodiment, analog current source 140 is an analog current source that generates compensation signal 116 by converting the voltage of filtered data signal 114 into a proportional current (i.e. compensation signal 116) that may be used to drive electronic device 150. The amperage of compensation signal 116 may depend on electronic device 150. For example, if electronic device 150 is a VCSEL, compensation signal 116 may be 8 mA. Accordingly, the current produced by analog current source 140 is a proportional, filtered version of data signal 112.

Current-mode driver 120 may also include a DC current source that is capable of biasing electronic device 140. The current source may be coupled in parallel with analog current source 140. The current from $I_{dc}$ may be any suitable bias current that may provide a sufficient current to electronic device 150 to allow the power level of the device to be modulated.

To maximize the power transfer between current-mode driver 120 and electronic device 150 and to minimize reflection, current-mode driver 120 may also include a termination resistor $R_{Term}$. The termination resistor may be configured to have an impedance that matches the output impedance of electronic device 150. For example, in embodiments where electronic device 150 is a VCSEL, $R_{Term}$ may have an output impedance of 60Ω to match the 60Ω impedance of the VCSEL. Current-mode driver 120 may also include one or more elements to provide protection against electrostatic discharge (ESD). In the illustrated embodiment, current-mode driver 120 includes ESD diodes to provide ESD protection while minimizing interference with compensation signal 116.

Modifications, additions, or omissions may be made to high-speed data transmission system 100 without departing from the scope of the invention. Although FIG. 1 shows an embodiment including logic 110, current-mode driver 120, and electronic device 150, system 100 may include more or less components. For example, the DC current source may be removed from current-mode driver 120 if electronic device 140 does not need to be biased. As another example, current-mode driver 120 may not be implemented as a single, unitary device. In such embodiments, various portions of current mode driver 120 may reside in different portions of system 100. Any suitable components may perform the functions of system 100. In another embodiment, filtering circuit 130 may be placed in a receiver circuit to provide equalization of the transmitted data signal 112.

FIGS. 3A-D are example waveforms showing the effects that current-mode driver 120 has on data signal 112. Waveform 300A illustrates a bit of data signal 112 as generated by logic 110. In the illustrated embodiment, data signal 112 is a square-wave-type pulse with vertical leading a falling edges and a flat frequency response. Data signal 112 may include a number of logical '0' and '1' bits represented as pulses. Although represented as ranging between negative one and one volts, data signal 112 may have any suitable amplitude and frequency capable of being used by electronic device 150.

Waveform 300B illustrates an example bit of data signal 112 right before being transmitted by electronic device 150. Waveform 300B represents data signal 112 that has not gone through pre-emphasis with current-mode driver 120. The data bit has experienced signal attenuation and degradation caused by the communication channels of the PCB and electronic device 150. Although the bit is supposed to represent a positive data pulse, the data bit instead has sloped leading and trailing edges and unsmooth frequency responses. The amplitude of the pulse is also lower than the original bit in waveform 300A. This degradation data signal 112 may lead to operational defects in electronic device 150 such as a failure to recognize waveform 300B as a logical '1'.

Waveform 300C illustrates a bit of compensation signal 116 after going through current-mode driver 120. After going through filtering circuit 130 and analog current source 140, the data bit of compensation signal 116 exhibits ringing with an underdamped transient decay. The ringing of compensation signal 116 may be determined by tuning inductor 134 and capacitor 136 of filtering circuit 130. The transient decay of the ringing may be determined by tuning resistor 132 and inductor 134. The changes made by current-mode driver 120 to data signal 112 provide pre-emphasis in order to overcome signal degradation and attenuation caused by the PCB and electronic device 150.

Waveform 300D illustrates an example bit of compensation signal 116 right before being transmitted by electronic device 150. In the illustrated embodiment, compensation signal 116 went through pre-emphasis with current-mode driver 120. Unlike waveform 300B, the bit of waveform 300D has maintained sufficient form to be properly used and transmitted by electronic device 150. Although it still exhibits signs of degradation and attenuation, by first undergoing pre-emphasis, waveform 300D may be used by electronic device 150.

Figure 4:
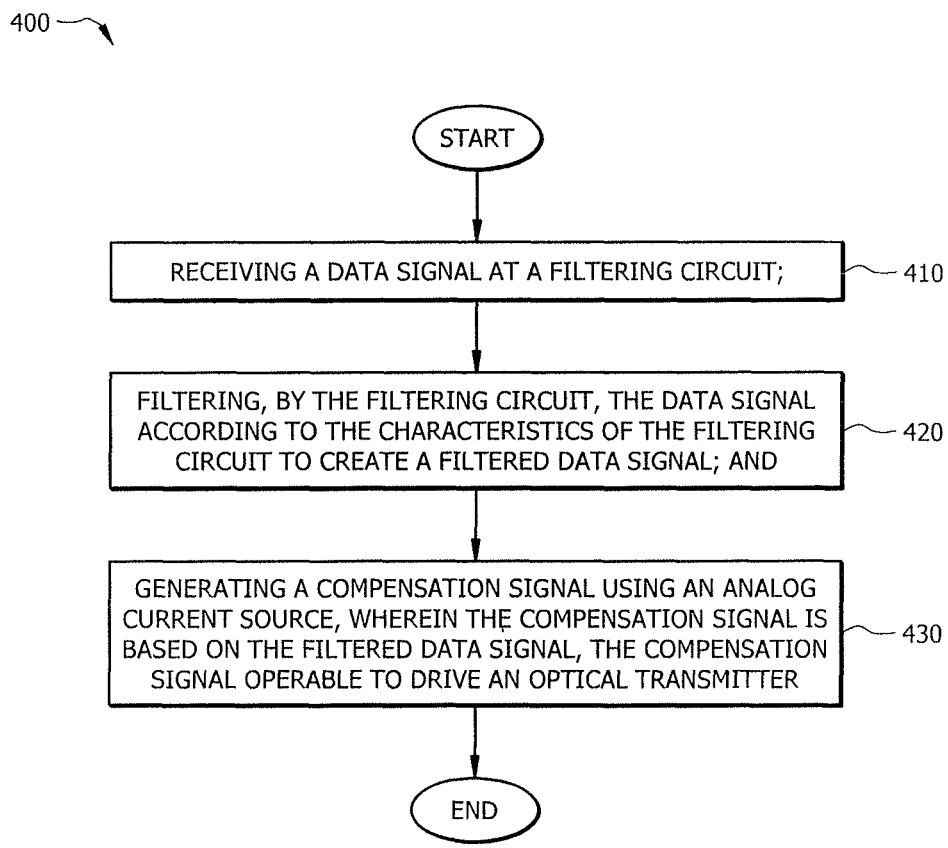
FIG. 4 is a flowchart illustrating a method for using a current-mode driver.

FIG. 4 is a flowchart illustrating a method 400 for using a current-mode driver 120. At step 410, filtering circuit 130 receives data signal 112 from logic 110. In certain embodiments, filtering circuit 130 may include resistor 132, inductor 134, and capacitor 136 in series (i.e., an RLC filter).

At step 420, filtering circuit 130 filters data signal 112 according to the characteristics of filtering circuit 130, creating filtered data circuit 114. In this example, data signal 112 is filtered according to the values of resistor 132, inductor 134, and capacitor 136. In certain embodiments, filtering circuit 130 is tuned to produce the inverse of the impulse response of data transmission system 100. For example, inductor 134 and capacitor 136 may be tuned to produce a ringing frequency in filtered data signal 114 that compensates for signal degradation and attenuation caused by PCB traces, backplanes, and connectors, as well as parasitic capacitances produced by the optical transmitter. Resistor 132 and inductor 134 may be tuned to produce an underdamped, transient decay in the ringing frequency. In certain embodiments, the transient decay may be tuned so that the ringing subsides in one bit period of data signal 112.

At step 430, analog current source 140 generates compensation signal 116 based on filtered data signal 114. Compensation signal 116 may be used to drive the optical transmitter. In certain embodiments, analog current source 140 uses the voltage signal of filtered data signal 112 and generates a current that follows the voltage waveform of filtered data signal 112. In this manner, filtering circuit 120 may produce filtered data signal 114 that will result in compensation signal 116 that is capable of driving an optical transmitter.

Various embodiments may perform some, all, or none of the steps described above. For example, the resistor and capacitor of filtering circuit 130 may be a variable resistor and a variable capacitor. In embodiments having a variable resistor and capacitor, filtering circuit 120 may dynamically be tuned in order to respond to changes in the drive circuit such as temperature changes in electronic device 150 or frequency changes in data signal 112. Although discussed as current-mode driver 120 performing these steps, any suitable component of data transmission system 100 may perform one or more steps of the method.

Although the present disclosure includes several embodiments, changes, substitutions, variations, alterations, transformations, and modifications may be suggested to one skilled in the art, and it is intended that the present disclosure encompass such changes, substitutions, variations, alterations, transformations, and modifications as fall within the spirit and scope of the appended claims.

What is claimed is:

1. A current-mode driver providing pre-emphasis for a transmitter, comprising:
   a filtering circuit comprising a resistor, an inductor, and a capacitor, the filtering circuit operable to receive a data signal and produce a filtered data signal, wherein the filtering circuit is tuned to produce a ringing frequency with an underdamped transient decay in the filtered data signal that compensates for signal degradation caused by the transmitter and the transient decay is tuned such that the ringing frequency subsides in one bit period of the data signal; and
   an analog current source coupled to the filtering circuit, wherein the analog current source is operable to generate a compensation signal based on the filtered data signal, the compensation signal operable to drive the transmitter.

2. The current-mode driver of claim 1, wherein the transmitter is a vertical-cavity surface-emitting laser (VCSEL).

3. The current-mode driver of claim 2, further comprising:
   a DC current source coupled to the analog current source and the VCSEL, wherein the DC current source is operable to bias the VCSEL; and
   a termination resistor coupled to the output of the analog current source and DC current source, the termination resistor operable to maximize the power transfer between the current-mode driver and the VCSEL.

4. The current-mode driver of claim 1, wherein the resistor is a variable resistor, the capacitor is a variable capacitor, and the inductor is a variable inductor.

5. The current-mode driver of claim 4, wherein the variable resistor, variable capacitor, and variable inductor are dynamically tuned in response to temperature changes in the transmitter.

6. The current-mode driver of claim 4, wherein the variable resistor, variable capacitor, and variable inductor are dynamically tuned in response to frequency changes in the data signal.

7. A method comprising:
   receiving a data signal at a filtering circuit comprising a resistor, an inductor, and a capacitor in series;
   filtering, by the filtering circuit, the data signal according to the characteristics of the resistor, inductor, and capacitor to create a filtered data signal, wherein the filtering circuit is tuned to produce a ringing frequency with an underdamped transient decay in the filtered data signal that compensates for signal degradation caused by a transmitter and the transient decay is tuned such that the ringing frequency subsides in one bit period of the data signal; and
   generating a compensation signal using an analog current source, wherein the compensation signal is based on the filtered data signal, the compensation signal operable to drive the transmitter.

8. The method of claim 7, wherein the inductor and capacitor of the filtering circuit are tuned to produce the ringing frequency in the filtered data signal that compensates for bandwidth limitations of the transmitter.

9. The method of claim 8, wherein the resistor and inductor of the filtering circuit are tuned to produce the underdamped transient decay in the filtered data signal to compensate for the bandwidth limitations of the transmitter.

10. The method of claim 7, wherein the transmitter is a vertical-cavity surface-emitting laser (VCSEL).

11. The method of claim 7, further comprising
    biasing the transmitter with a DC current source that is coupled to the analog current source.

12. The method of claim 7, wherein the resistor is a variable resistor, the capacitor is a variable capacitor, and the inductor is a variable inductor.

13. An apparatus comprising:
    a filtering circuit comprising a resistor, an inductor, and a capacitor in series, wherein the filtering circuit receives a data signal and generates a filtered data signal according to characteristics of the resistor, inductor, and capacitor, wherein the filtering circuit is tuned to produce a ringing frequency with an underdamped transient decay in the filtered data signal that compensates for signal degradation caused by a transmitter and the transient decay is tuned such that the ringing frequency subsides in one bit period of the data signal; and
    an analog current source coupled in series to the filtering circuit, wherein the analog current source generates a compensation signal based in part on the filtered data signal, the compensation signal operable to drive the transmitter.

14. The apparatus of claim 13, wherein the inductor and capacitor of the filtering circuit are tuned to produce the ringing frequency in the filtered data signal that compensates for bandwidth limitations of the transmitter.

15. The apparatus of claim 14, wherein the resistor and inductor of the filtering circuit are tuned to produce the underdamped transient decay in the filtered data signal to compensate for the bandwidth limitations of the transmitter.

16. The apparatus of claim 13, further comprising:
    a DC current source coupled to the analog current source and an optical transmitter, wherein the DC current source is configured to bias the transmitter; and
    a termination resistor coupled to the output of the analog current source and DC current source.

17. The apparatus of claim 13, wherein the transmitter is a vertical-cavity surface-emitting laser (VCSEL).

18. The apparatus of claim 13, wherein the resistor is a variable resistor, the capacitor is a variable capacitor, and the inductor is a variable inductor.

19. The apparatus of claim 18, wherein the variable resistor, variable inductor, and variable capacitor are dynamically tuned in response to temperature changes in the transmitter.

20. The apparatus of claim 18, wherein the variable resistor, variable capacitor, and variable inductor are dynamically tuned in response to frequency changes in the data signal.

* * * * *